United States Patent [19]

DeVore et al.

[11] Patent Number: 5,658,364
[45] Date of Patent: Aug. 19, 1997

[54] METHOD OF MAKING FIBER OPTIC-TO-METAL CONNECTION SEALS

[75] Inventors: Lauri J. DeVore, Seattle, Wash.; Daniel P. Kramer, Centerville, Ohio

[73] Assignee: EG&G Mound Applied Technologies, Miamisburg, Ohio

[21] Appl. No.: 301,355

[22] Filed: Sep. 6, 1994

[51] Int. Cl.⁶ .................................................. C03B 23/20
[52] U.S. Cl. .......................... 65/431; 65/43; 65/59.4; 65/59.5
[58] Field of Search ............... 65/431, 385, 33.5, 65/33.4, 43, 39.4, 387, 406, 78, 85, 59.5

[56] References Cited

U.S. PATENT DOCUMENTS

| | | | |
|---|---|---|---|
| 4,011,093 | 3/1977 | Veres | 106/52 |
| 4,119,363 | 10/1978 | Camlibel | 250/552 |
| 4,413,881 | 11/1983 | Kovats | |
| 4,589,899 | 5/1986 | Hudecek | 65/59.5 |
| 4,691,985 | 9/1987 | Shank | |
| 4,729,624 | 3/1988 | Kakii | 385/78 |
| 4,892,381 | 1/1990 | Glasheen | 29/851 |
| 4,925,266 | 5/1990 | Huebscher | 385/78 |
| 5,048,912 | 9/1991 | Kunikane | 65/59.4 |
| 5,143,531 | 9/1992 | Kramer | 65/3.11 |
| 5,155,795 | 10/1992 | Wasserman | 385/138 |
| 5,177,806 | 1/1993 | Abbott | 385/76 |
| 5,228,975 | 7/1993 | Yamada | 204/424 |
| 5,305,413 | 4/1994 | Payne | 385/128 |
| 5,480,523 | 1/1996 | Cocker | 402/153.18 |

FOREIGN PATENT DOCUMENTS

| | | | |
|---|---|---|---|
| 57-198406 | 12/1982 | Japan | 65/431 |
| 59-111121 | 6/1984 | Japan | 65/431 |

Primary Examiner—John Hoffmann
Attorney, Agent, or Firm—Thompson Hine & Flory LLP

[57] ABSTRACT

The invention is a method of making fiber optic-to-metal connection seals. The optical fiber and a preform made of a sealing material are inserted into a metal cup. The metal is then heated to a temperature which melts the sealing material to form a hermetic seal between the cup and the fiber optic. The hermetic sealing material is selected from glass, glass-ceramic or braze and the metal is selected form stainless steel, a metal alloy or a high-strength superalloy. In a preferred method, the optical fiber is coated with a plastic buffer or pliant metal jacket.

2 Claims, 7 Drawing Sheets

METHOD OF MAKING FIBER OPTIC-TO-METAL CONNECTION SEALS

BACKGROUND OF THE INVENTION

The present invention relates generally to a technique for sealing an end of an optical fiber to a metal component. This subsequently enables the making of a spliced connection between lengths of optical fibers.

The application of fiber optics for a particular use is dependent on the requirement of being able to connect or splice one length of glass fiber to another length. These connections have, in the past, been performed in a number of ways.

Methods of sealing an optical fiber with a metal have used ferrules to clamp or glue the fibers together. These ferrules then are optically aligned in a mechanical process. Another known method is to pass the fiber through a threaded nut, glue or solder the fiber to the nut and then attach the nut to the assembly. These methods produced non-hermetic seals which contained cracks. A third previously used method was the Fiber Insertion Technique of U.S. Pat. No. 5,143,531. This method requires the heat source to be removed while the fiber optic is inserted into the previously heated molten glass. However, it is difficult to accurately place the fiber within the molten glass. None of these prior methods provide a connection or splice which is hermetic to the degree that is necessary for certain types of components which require a helium leak rate of less than $1 \times 10^{-8}$ cm$^3$/sec.

Other problems occur in sealing the fiber to the metal component since the fibers are usually coated in a protective coating buffer. Without this buffer, the fibers are easily broken, but with these buffers, which are usually made of plastic, the fibers cannot withstand the high temperatures used for the sealing. The glass fibers themselves are typically thin (approximately 0.008 inch wide) so that they will also deform and lose strength at the high temperatures required for sealing. In addition, the differences in the thermal expansion coefficients of the optical fibers and the metal components further complicate the development of the fiber optic components, since most optical fibers have very low coefficients of thermal expansion (i.e., less than $10 \times 10^{-7}$ cm/cm/° C. between room temperature and 300° C.) while certain metals, such as high-strength superalloys used in fiber optic components, typically have very large coefficients of thermal expansion (i.e., about $145 \times 10^{-7}$ cm/cm/° C. between room temperature and 300° C.). This mismatch of thermal expansions causes cracks in the fibers and around the fibers. Furthermore, other problems have occurred causing loss of light from cracks when joining the lengths of the fiber optics.

Therefore, it is an object of the present invention to seal optical fibers to metal components in such a manner that the components are hermetic (measured helium leak rate of less than $1 \times 10^{-8}$ cm$^3$/sec) and crack-free. The metal components will eventually be connected to other metal components in order to splice the optical fibers.

Other and further features, advantages, and benefits of the invention will become apparent in the following description taken in conjunction with the following drawings.

It is to be understood that the foregoing general description and the following detailed description are exemplary and explanatory but are not to be restrictive of the invention. The accompanying drawings which are incorporated in and constitute a part of this invention, illustrate the embodiments of the invention, and, together with the description, serve to explain the principles of the invention in general terms. Like numerals refer to parts throughout the disclosure.

SUMMARY OF THE INVENTION

In accordance with the present invention, a method is provided for sealing an optical fiber to a metal component by inserting an optical fiber into a metal component, wherein the metal component comprises a metal cup, inserting a sealing material into a space between the metal cup and the fiber, and heating the metal cup to seal the fiber with the sealing material into the metal component.

In accordance with a further method of the present invention, the sealing material is glass, the metal shell is an alloy, the fiber is coated with a plastic buffer and the heating is rapid inductive heating such that a glass seal is formed.

In accordance with a still further method of the present invention, the sealing material is glass, the metal cup is stainless steel, the fiber is coated with a plastic buffer and the heating is indirect in-situ heating such that a glass seal is formed.

In accordance with a still further method of the present invention, the sealing material is a glass-ceramic, the metal cup is a high strength superalloy, the fiber is coated with a pliant metal jacket and the heating is furnace heating forming a glass-ceramic seal.

In accordance with a still further method of the present invention, the sealing material is a braze material and the fiber optic is coated with a pliant metal jacket such that said braze material is soluble in the metal cup and the pliant metal jacket forming a brazed seal.

DESCRIPTION OF THE PREFERRED EMBODIMENT

The present invention is drawn to a method of hermetically sealing optical fibers to metal components.

In general, an optical fiber is placed at the desired position within the metal component. The metal component comprises a metal cup with a drilled hole for insertion of the fiber optic. The fiber is hermetically sealed to the metal component by use of a preformed material which is inserted or filled within the space between the metal cup and the fiber and heated to form a fiber/molten material/metal component seal. The metal cup may be an alloy, a high-strength superalloy, or stainless steel, and the preform material may be glass or braze material.

Figure 1:
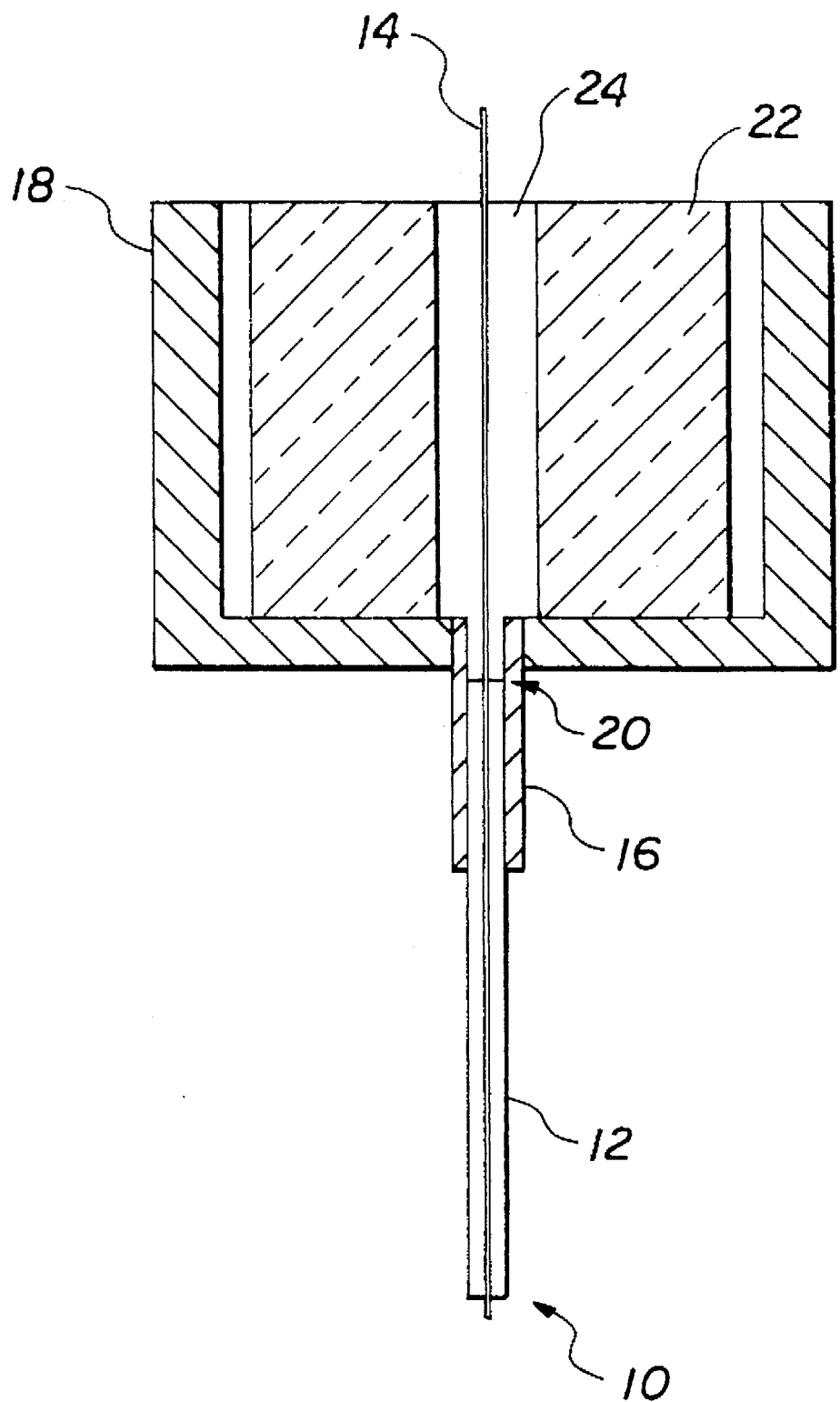
FIG. 1 is a first embodiment of the invention before heating.

In a first embodiment, optical fibers are sealed in glass to the metal component. The component is heated by a rapid inductive heating process which will be described with respect to FIG. 1. The optical fiber 10 is preferably formed of fused silica having a protective plastic buffer 12. The buffer is typically made of an organic material. It is commercially available with the fiber from Fiberguide Industries, Sterling, N.J. The plastic buffer is meant to protect the fiber from moisture and abrasion. A one-half inch length of this buffer is then stripped 14. The fiber is fed through a ceramic feeder tube or ferrule 16 typically made of alumina, into a drilled hole in a metal cup 18, such that the exposed fiber/buffer interface (20) is level with or slightly below the cup bottom. The metal cup can be made of nickel-based superalloys or alloys of stainless steel. The diameter of the hole is several times larger than the diameter of the fiber. Preferably, it is about 0.070 in.

Figure 2:
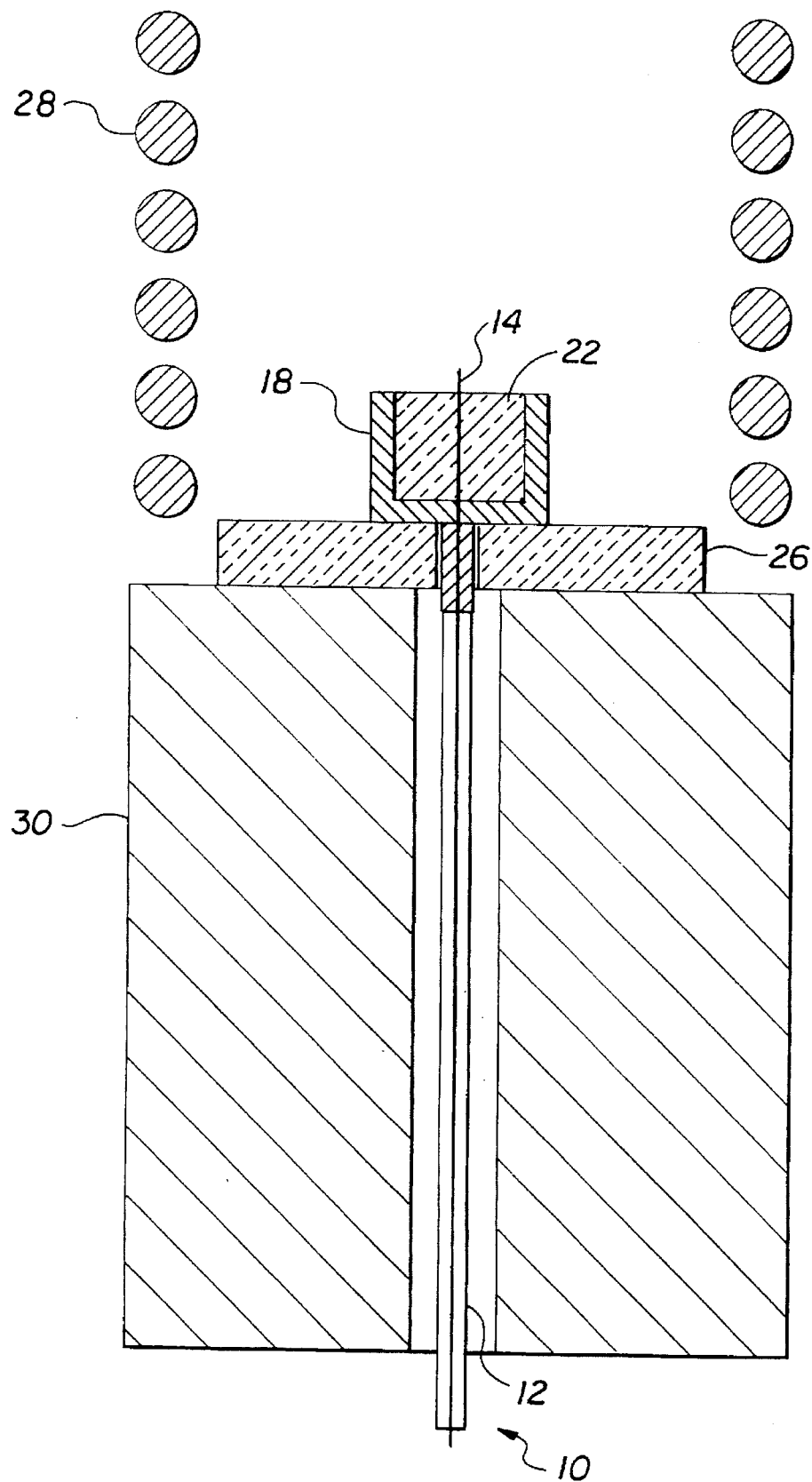
FIG. 2 is the apparatus of FIG. 1 during heating.

A glass preform 22 containing a drilled hole 24 is placed in the cup over the fiber. The glass preform may be made of a multicomponent silicate glass. For example, 7052, commercially available from Corning may be used. It is essential, however, that the glass have a coefficient of thermal expansion intermediate to, preferably midrange between those of the metal shell and the optical fiber. The buffered fiber 12 and the ceramic feeder tube 16 are shielded from the cup by a layer of insulation 26, such as ceramic fiber wool, as seen in FIG. 2. The above described cup is placed in an induction coil 28 of appropriate size such as about 2 in. in diameter on a boron nitride stand 30. The shell 18 is sufficiently heated by inductive currents to melt the glass preform to form a sealed glass 32 which seals the exposed fiber to the metal component. However, the remaining ceramic feeder tube and buffer fiber are not affected by the inductive current because they are shielded from the heat of the shell by the insulation. Therefore, they remain intact and unaffected by the heat. A typical heating technique is induction heating. However, precautions must be taken to avoid thermal shocking of the component, which may cause cracking of the glass, or optical fiber during cooling.

The advantage of this technique is that the optical fiber only sees heat in the sealing region, and the plastic buffer is left relatively intact. The sealing can be completed in a matter of seconds, because of the rapid inductive heating. The temperature of the component can be controlled, and the seal can be annealed by controlling the power output by the use of a temperature controller.

A particular example of the first embodiment will now be described in accordance with Example I.

EXAMPLE I

The metal cup is made from C-4 alloy, which is an iron chromium alloy. The ceramic feeder is a 0.062 inch outside diameter, by 0.035 inch inside diameter alumina tube. The glass preform is a 7052 glass by Corning Glass Works, Corning, N.Y., which has a softening temperature of 850° C. and a thermal expansion coefficient of $53 \times 10^{-7}$ in/in/° C. The fiber optic is a Spectraguide 100/140 micron step-index silica fiber from Fiberguide industries of Sterling, N.J.

The metal component is fixtured in the insulation on the boron nitride stand. This is then placed in the induction coil and heated to about 1100° C. for about 25 seconds. This is high enough to melt the glass preform and seal the component.

The temperature is then lowered to about 450° C. and the glass is annealed for about 30 minutes. The hermeticity of the resulting seal is characterized by a helium leak rate of less than $1 \times 10^{-9}$ $cm^3$ of helium per second.

Figure 3:
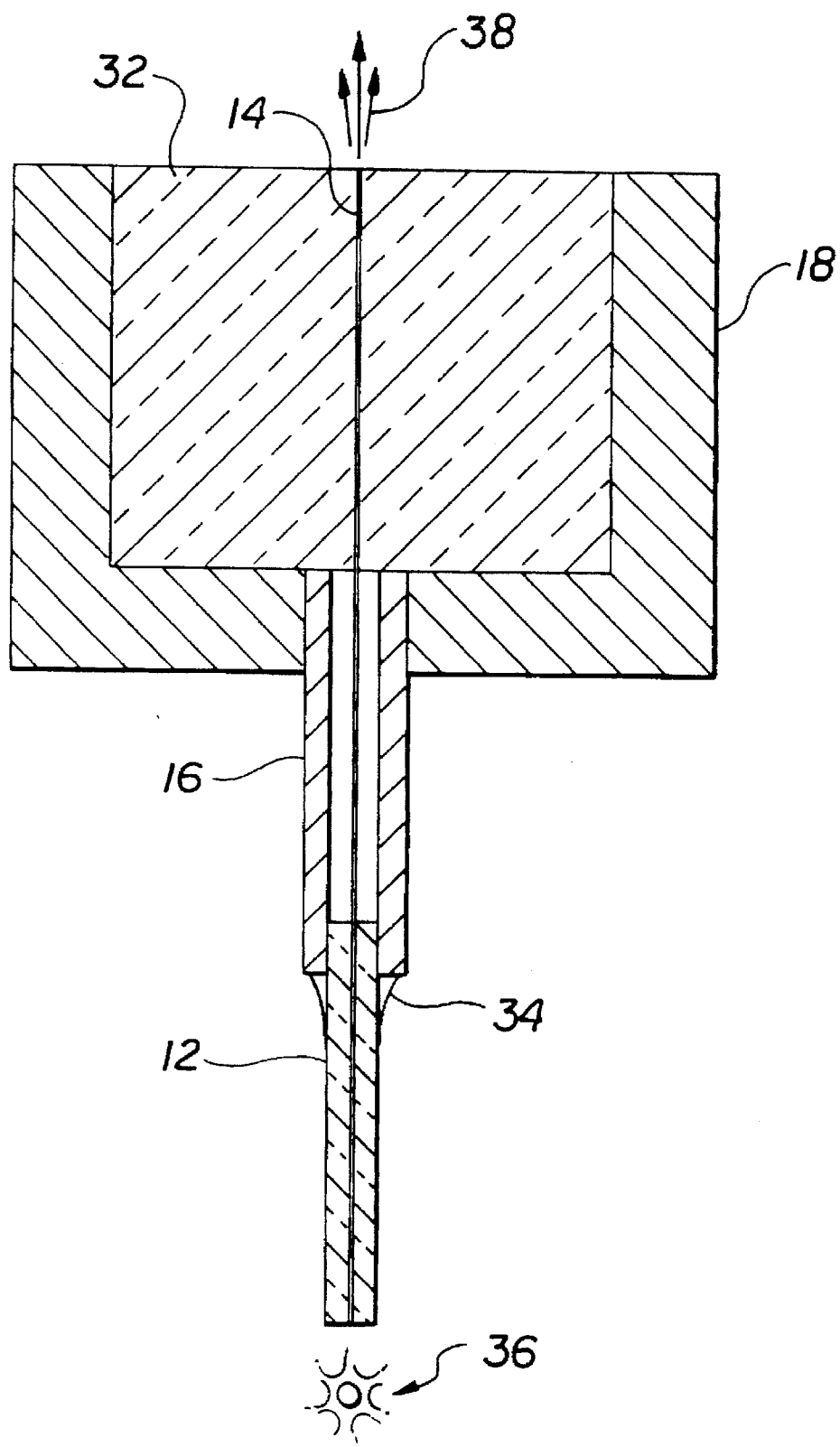
FIG. 3 is the completed apparatus of the first embodiment.

FIG. 3 shows the completed hermetically sealed component with fiber 14 directly sealed in annealed sealing glass 32 to the metal component 18 forming a fiber/glass/metal component seal. Epoxy 34 is used to reduce the strain that may be placed on the fiber at the end of the alumina tube due to the bending of the length of the fiber during handling or use. This drawing shows the direct result from light source 36 exiting through the component to the other side 38 without loss of light.

EXAMPLE II

Figure 4A:
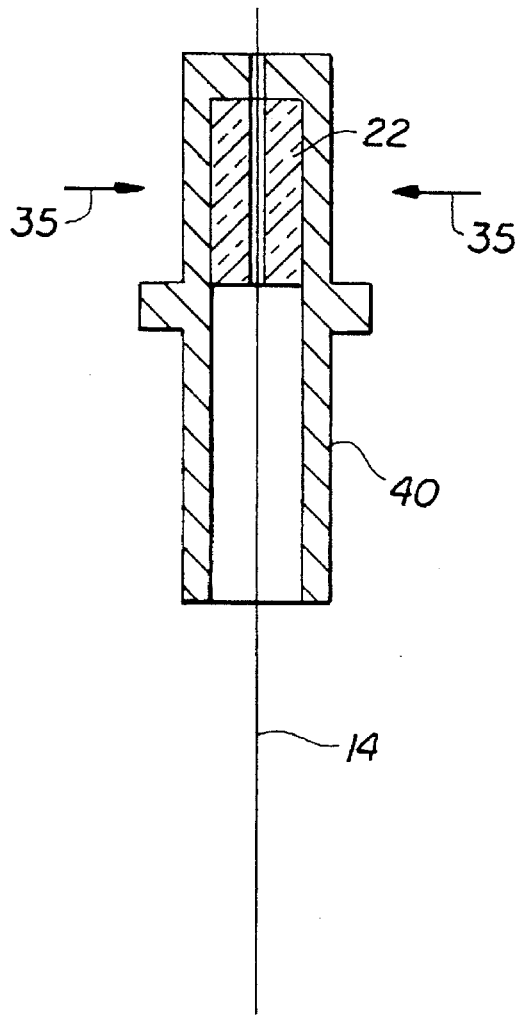
FIG. 4(a) is a second embodiment of the invention before heating.
Figure 4B:
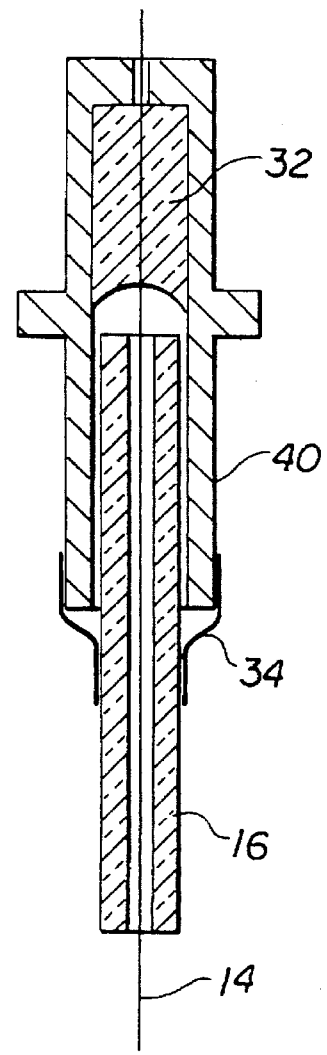
FIG. 4(b) is the completed second embodiment of the invention.

A second embodiment modifies the first embodiment by using radiant and conductive heating to melt the glass preform and form a hermetic, fiber optic-to-metal component seal. In this method, the optical fiber is inserted into the hole in the glass preform in the metal cup, as in the first embodiment. However, in place of induction heating, the assembly is then heated to a temperature at which the preform melts by an indirect in-situ heating process, preferably a propane torch 35, in the range of 800° to 1100° C., as seen in FIGS. 4(a) and 4(b).

The metal cup 40 is made of a 303 stainless steel piece part which was designed to be type useable for a fiber optic connector. The glass preform 22 is about 0.125 inch in diameter with a 0.04 inch diameter hole drilled down the center of the preform. This glass has a softening point of about 780° C. and a coefficient of thermal expansion of about $100 \times 10^{-7}$ cm/cm/° C. Again, a 100/140 micron step-index fiber commercially available from Fiberguide Industries is used.

The fiber is placed in the connector within the glass preform. This is then heated with a propane torch which flame is allowed to impinge upon the outside of the connector. The sealing operation is completed in less than one minute.

The resulting seal has a helium leak rate of less than $1 \times 10^{-9}$ $cm^3$/sec, which is hermetic.

EXAMPLE III

Figure 5:
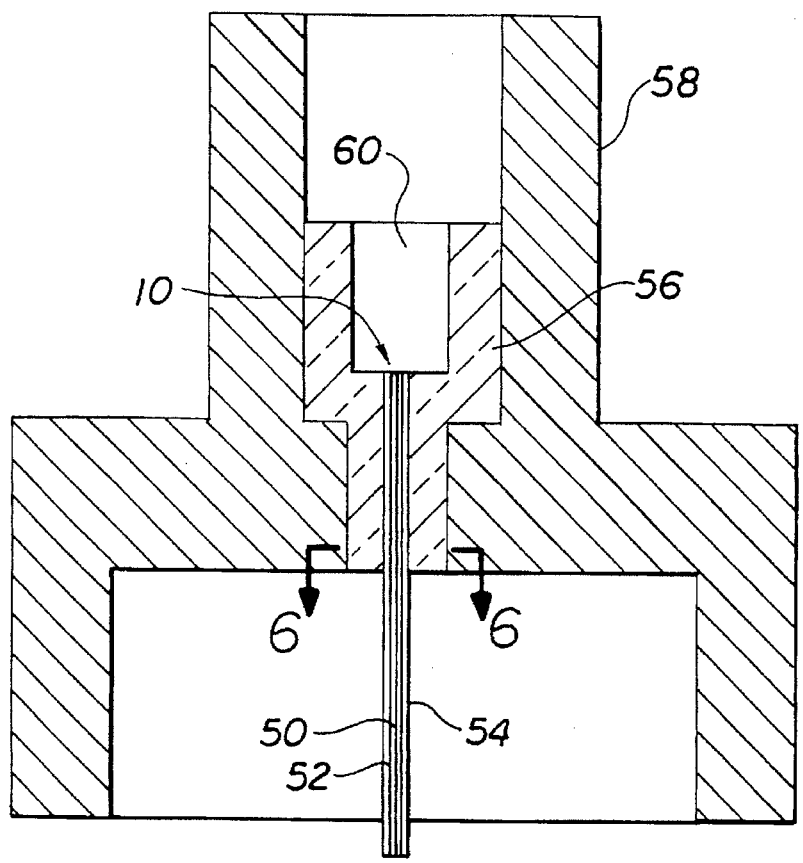
FIG. 5 is a blow-up of a metal jacketed optical fiber.

The third embodiment of the present invention also forms a glass-to-metal seal, but does not require a rapid heating process. In the above two embodiments, the fibers are relatively heat-sensitive and very brittle once the plastic cladding buffer has been burned off or removed. However, in this embodiment, the optical fiber has a metal jacket that protects the fiber during heating and allows it to be pliant even after it is heated. In addition, the metal jacket consists of a material, such as a noble metal, preferably gold, which can diffuse into the surrounding sealing glass, thereby forming a diffusion bond between the fiber and the molten glass. A preferable coating is shown in cross-section with reference to FIG. 5. A core 50 of about 100-micron diameter, which itself is surrounded by a gold jacket 54 of about 15-micron thick or a jacket of another metal such as aluminum.

Figure 6:
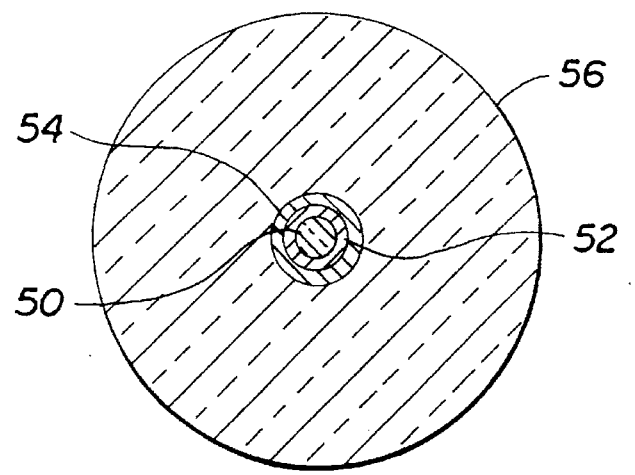
FIG. 6 is a third embodiment of the invention.

The metal shell 58 is placed on a graphite fixture (not shown). The glass preform 56 is preferably a glass which has a thermal expansion coefficient of about $100 \times 10^{-7}$/cm/cm/° C. between room temperature and 300° C. The gold-coated fiber 10 is positioned in a metal cup and heated using a high temperature furnace. See FIG. 6.

This produces a helium leak rate of less than $1 \times 10^{-9}$ $cm^3$/sec confirming that components fabricated using this technique are hermetic.

The metal cup in this embodiment is preferably a high-strength superalloy of Inconel 718, which has a thermal expansion coefficient of about $145 \times 10^{-7}$ cm/cm/° C. between room temperature and 300° C. Even with this superalloy being used as the metal cup, which has a greatly different coefficient of thermal expansion than the glass-ceramic, the seal will still be hermetic with a less than 1×10⁻⁹ cm³/sec helium leak rate and will be crack-free.

This specific thermal cycle and glass ceramic were used in this example to give the high thermal expansion necessary to form a crack-free seal with the superalloy. However, it would result in cracks near or within the fiber if it did not have a compliant gold jacket. This jacket allows the formation of crack-free seals since it relieves the potentially damaging stresses that result from the large thermal expansion mismatch between the glass preform and the fiber.

EXAMPLE IV

The fourth embodiment of the present invention uses a metal alloy braze in place of glass to form the fiber optic-to-metal seals. A braze is a metal or metal alloy that when heated melts and forms seals with various piece parts. Suitable examples for this are gold or copper alloys. Glass or glass-ceramic to metal seals possess inherent limitations because they are relatively brittle and are subject to failure because of thermal shock. Braze seals are relatively insensitive to thermal shock and the build-up of stresses since they contain a ductile metal. Any stresses which arise due to thermal expansion mismatches are readily relieved due to the ductility of the braze.

Figure 7:
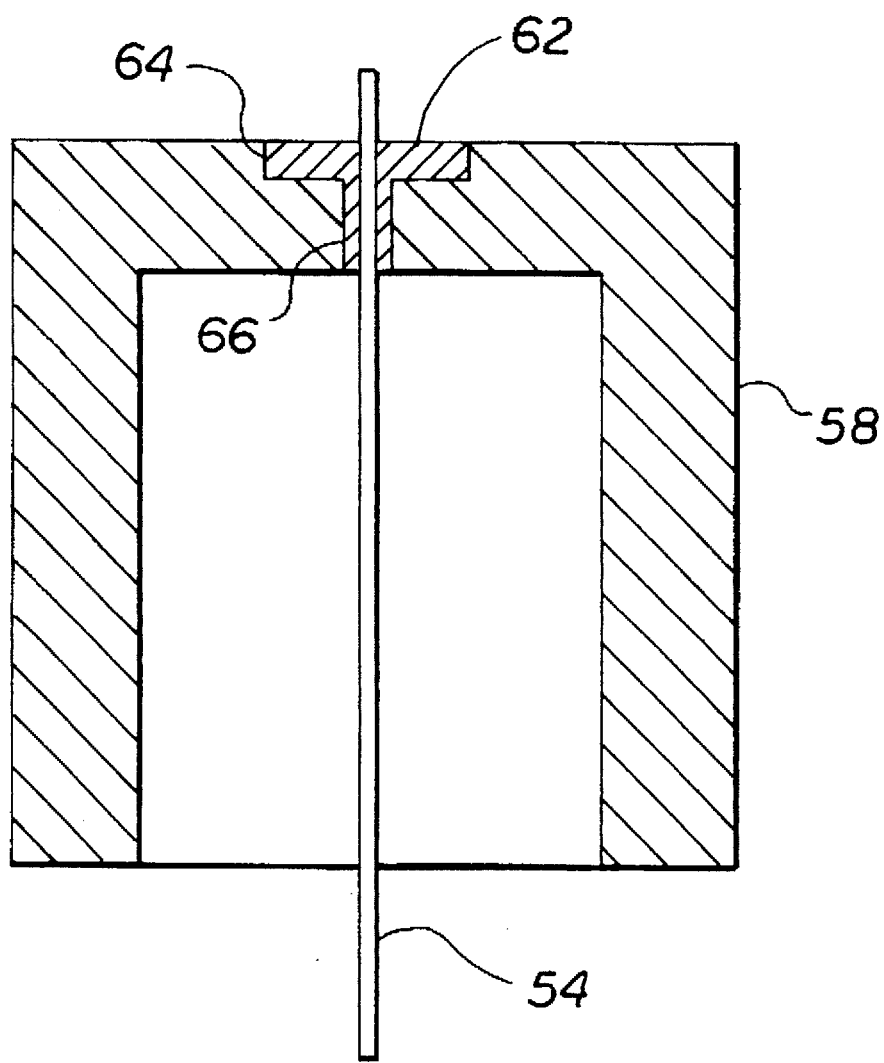
FIG. 7 is a fourth embodiment of the invention.

As seen in FIG. 7, the metal component is the same high-strength superalloy 58 as in Example III and the fiber 54 is the same gold-jacketed fiber of Example III. However, in this example, a braze material 62 is used in place of the glass or glass-ceramic preform. The braze material consists of about 82 wt % gold and 18 wt % nickel. This particular composition of braze material is used since the optical fiber contains a gold jacket and Inconel 718 contains about 50 wt % nickel. Also, the elemental species in the braze are soluble in the fiber jacket and in the Inconel 718.

Figure 8:
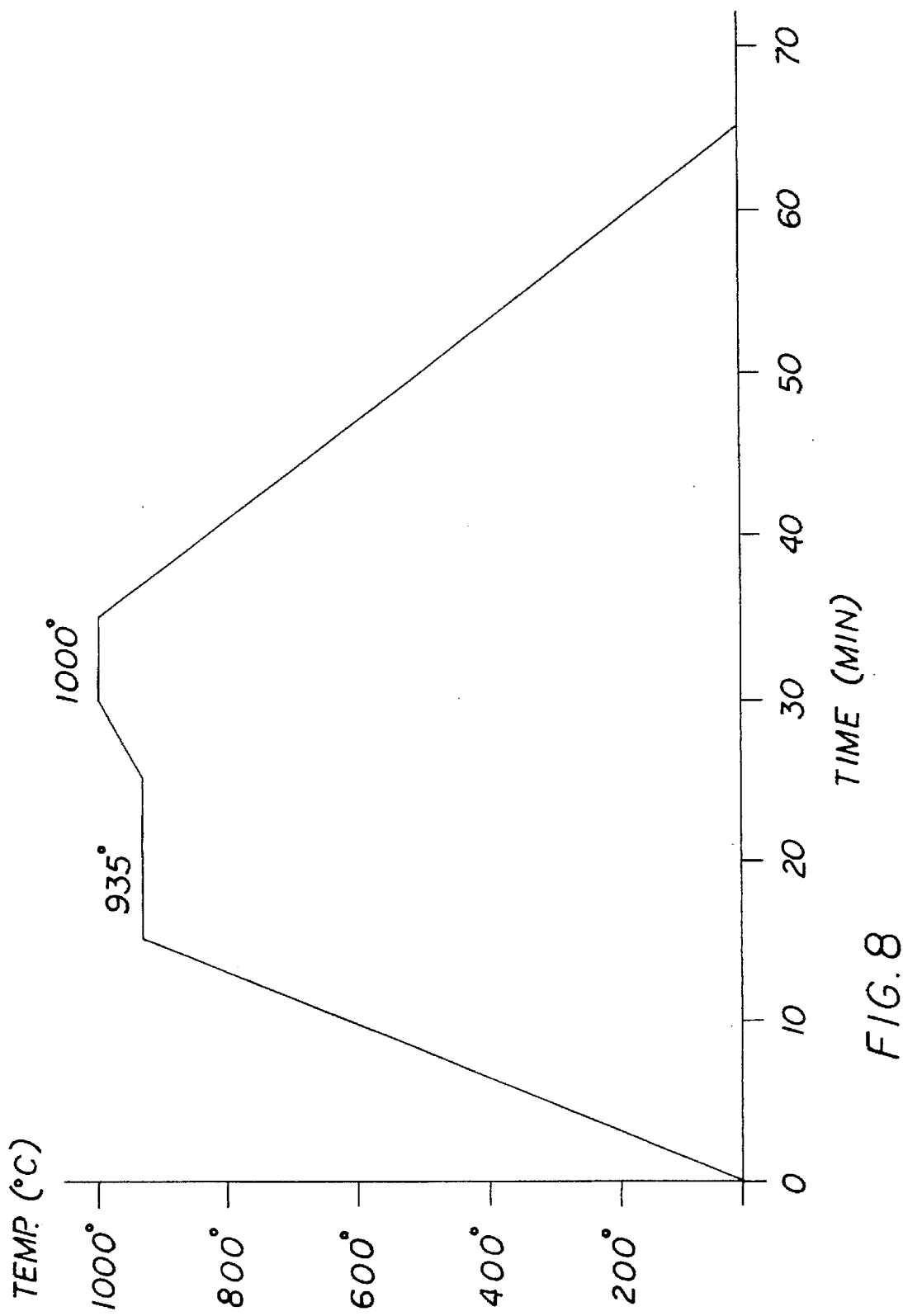
FIG. 8 is a time/temperature cycle of the furnace of the fourth embodiment.

The metal cup 58 is placed on a graphite fixture and a braze ring is placed in a counterbore 64 on the top of the shell. The fixture is then heated in a furnace using the time temperature profile of FIG. 8 to braze. It is heated at 935° C. for 10 minutes and then the heat is increased to 1,000° C. for 5 minutes.

During brazing, the braze metal melts, and the gold jacket tends to "dissolve" into the braze material, while the nickel in the braze bonds with the Inconel 718 shell. This forms a metal-to-metal bond which forms a very strong hermetic seal.

In addition, the gold/nickel braze wets the surface of the jacketed fiber and the metal cup. This is critical in forming a hermetic seal, since the braze material flows completely down the drilled hole between the optical fiber and the metal cup. The clearance in the drilled hole between the fiber and the cup is less than 0.002 inch.

Helium leak tests confirmed that components fabricated using this technique are hermetic since the helium leak rate is measured to be less than 1×10⁻⁹ cm³/sec.

These brazed seals are typically two to ten times stronger than glass or glass-ceramic/metal seals.

As opposed to the fiber insertion technique of U.S. Pat. No. 5,143,531, using the method of any of the above embodiments of this invention, one can place the fiber optic in position prior to sealing without placing the fiber directly in the path of a flame. Also, since it is fixtured before it is sealed, tolerances can be closely held and multiple assemblies can be fabricated prior to sealing.

In addition, hermetic, crack-free splices can be made between optical fibers since such tight seals are made between the metal components and the fibers.

Components fabricated using any of the above techniques have numerous applications. Applications are possible in the commercial industry, telephone communication systems, and actuators, headers and ignitors for explosive and pyrotechnic components.

Sealing an optical fiber into a metal connector gives the design engineer more flexibility in designing fiber optic components. By sealing directly into a connector, the optical characteristics of the fiber can be readily determined prior to use. In a pyrotechnic, quality can be judged prior to loading.

The specific materials used for the metal cup, glass, braze and optical fiber are not critical for this technique and other equivalent materials may be used without affecting the scope of the invention.

Having described the invention in detail and by reference to preferred embodiments thereof, it will be apparent that modifications and variations are possible without departing from the scope of the invention defined in the appended claims.

What is claimed is:

1. A method for hermetically sealing an optical fiber into a metal component comprising the steps of:

inserting an optical fiber having a coating into a metal component;

inserting a sealing material into a space between said component and said fiber;

heating said metal component using a temperature sufficient to seal said fiber with said sealing material into said metal component by heating, thereby forming a hermetic seal between said metal component and said optical fiber, wherein said coating remains intact, and wherein said sealing material is glass ceramic, said metal cup is a superalloy, said fiber is coated with a pliant metal jacket and said heating is furnace heating, thereby forming a glass-ceramic seal.

2. The method of claim 1 wherein said pliant metal jacket is a gold-jacket.

* * * * *

UNITED STATES PATENT AND TRADEMARK OFFICE
CERTIFICATE OF CORRECTION

PATENT NO. : 5,658,364
DATED : August 19, 1997
INVENTOR(S) : Lauri J. DeVore and Daniel P. Kramer It is certified that error appears in the above-indentified patent and that said Letters Patent is hereby corrected as shown below:

Col. 1, line 1, insert

-- The U.S. Government has a paid-up license in this invention and the right in limited circumstances to require the patent owner to license others on reasonable terms as provided for by the terms of contract No. DE-AC24-970H20044 awarded by the Department of Energy. --

Signed and Sealed this

Twenty-third Day of June, 1998

Attest:

BRUCE LEHMAN

*Attesting Officer*  *Commissioner of Patents and Trademarks*